(12) United States Patent
Zaid et al.

(10) Patent No.: US 6,494,218 B1
(45) Date of Patent: Dec. 17, 2002

(54) METHOD OF REMOVING METAL SULFATES FROM SURFACES

(75) Inventors: Gene H. Zaid, Sterling, KS (US); Beth Ann Wolf, Hutchinson, KS (US)

(73) Assignee: Jacam Chemicals, L.L.C.

( * ) Notice: Subject to any disclaimer, the term of this patent is extended or adjusted under 35 U.S.C. 154(b) by 137 days.

(21) Appl. No.: 09/654,539

(22) Filed: Sep. 1, 2000

Related U.S. Application Data

(62) Division of application No. 09/301,248, filed on Apr. 28, 1999, now Pat. No. 6,331,513.

(51) Int. Cl.⁷ .............................. B08B 9/00; C02F 5/12; C02F 5/14
(52) U.S. Cl. .................. 134/22.16; 507/237; 507/927; 510/188; 510/247; 510/435; 510/436
(58) Field of Search ................................. 510/253, 188, 510/247, 435, 436; 134/22.16; 252/180, 181; 423/DIG. 14; 507/237, 927

(56) References Cited

U.S. PATENT DOCUMENTS

| | | | |
|---|---|---|---|
| 2,777,818 A | 1/1957 | Gambill | 252/180 X |
| 2,787,326 A | 4/1957 | Hughes | 507/927 X |
| 3,660,287 A | 5/1972 | Quattrini | 507/927 X |
| 3,684,720 A | 8/1972 | Richardson | 252/181 X |
| 3,699,048 A * | 10/1972 | Krueger et al. | 252/180 |
| 3,951,827 A | 4/1976 | Burroughs et al. | 166/312 X |
| 3,958,635 A | 5/1976 | Zilch et al. | 252/180 X |
| 4,144,185 A | 3/1979 | Block | 252/180 X |
| 5,059,333 A | 10/1991 | Hen | 252/180 X |
| 5,068,042 A | 11/1991 | Hen | 252/180 X |
| 5,084,105 A | 1/1992 | Morris et al. | 252/180 X |
| 5,183,112 A | 2/1993 | Paul et al. | 166/312 |
| 5,622,569 A * | 4/1997 | Dennis et al. | 510/435 X |
| 5,762,821 A | 6/1998 | Tate | 252/181 X |
| 5,969,003 A | 10/1999 | Foucher et al. | 523/160 |
| 6,331,513 B1 * | 12/2001 | Zaid et al. | 510/253 |

\* cited by examiner

Primary Examiner—Richard D. Lovering
(74) Attorney, Agent, or Firm—Hovey Williams LLP

(57) ABSTRACT

A scale dissolver composition and method for using the composition is provided. Broadly, the dissolver compositions are formed by adding a base such as ammonium hydroxide to a mixture comprising a salt of a chelating agent, a carbonate, and a component selected from the group consisting of organophosphorus compounds, carboxylic acids, and mixtures thereof. The preferred organophosphorus compound is aminotrismethylidine diphosphonic acid while the preferred chelating agent salt is EDTA tetrasodium salt. In use, the dissolver composition is preferably heated to a temperature of from about 100–170° F. and then contacted with the target scale. The compositions are particularly useful for removing barium sulfate and calcium sulfate scales from gas and oil well and pipeline equipment in an efficient and cost-effective manner.

17 Claims, No Drawings

METHOD OF REMOVING METAL SULFATES FROM SURFACES

RELATED APPLICATIONS

This application is a divisional of U.S. patent application Ser. No. 09/301,248, filed Apr. 28, 1999, now issued as U.S. Pat. No. 6,331,513.

BACKGROUND OF THE INVENTION

1. Field of the Invention

The present invention is broadly concerned with compositions for dissolving scales (and particularly metal sulfate scales) and methods of using the same. More particularly, the scale dissolver compositions of the invention comprise an aqueous dispersion which includes a salt of a chelating agent, a carbonate, a base, and a component selected from the group consisting of organophosphorus compounds, carboxylic acids, and mixtures thereof. In use, the dissolver compositions are contacted with the target scale, preferably after first heating the composition. The compositions are particularly useful for removing calcium sulfate and barium sulfate scales from gas and oil well equipment, boilers, and pipes.

2. Description of the Prior Art

Many waters contain alkaline earth metal cations such as barium, strontium, calcium, and magnesium, and anions such as sulfate, bicarbonate, carbonate, phosphate, and fluoride. When combinations of these anions and cations are present in concentrations which exceed the solubility product of the various species which may potentially be formed, precipitates form until the respective solubility products are no longer exceeded. For example, when concentrations of barium and sulfate ions exceed the solubility product of barium sulfate, a solid phase of barium sulfate will form as a precipitate. The formation of solubility products are affected by several factors including pH, temperature, pressure, and the presence of a seed crystal. When these solubility products form, they precipitate on the surface of water-carrying or water-containing systems and form adherent deposits or scales which cause serious problems. For example, during gas and oil production, scale plugging of surface and subsurface equipment, tubings, and perforations often lead to severe productivity declines and difficult operating conditions. Of the sulfate scales, barium sulfate is particularly troublesome because of its extreme insolubility.

Previous methods have been attempted to dissolve sulfate scales. For example, U.S. Pat. No. 5,183,112 to Paul et al. discloses a method for dissolving calcium sulfate wherein a scale-removing solvent comprising a chelating agent and the anions of a monocarboxylic acid, oxalates, or thiosulfates is injected into a well followed by sparging of the solvent with air or an inert gas. However, sparging with air or gas is a difficult and messy process, and is quite messy.

Prior art attempts at dissolving barium sulfate include utilizing boiling sulfuric acid. This is impractical and dangerous for dissolving downhole barium sulfate. Another method for removing barium sulfate is to fracture ("frac") it with extremely high pressure. However, this process is quite costly in that it requires special equipment and extra manpower, and results in lengthy well downtimes. Another prior art process for removing barium sulfate is to perforate the scale. This is also not very effective. In some instances, when scales present too much of a problem, the well is simply abandoned and a new well is drilled when scales present too much of a problem. Obviously, this is a very costly solution.

SUMMARY OF THE INVENTION

The present invention overcomes the prior art problems by providing an effective, inexpensive scale dissolver that is particularly effective at dissolving sulfate scales such as alkaline earth metal sulfate scales. Furthermore, the dissolver compositions of the invention are relatively easy to use.

The scale dissolver compositions comprise an aqueous dispersion which includes a salt of a chelating agent, a carbonate, a base, and a component selected from the group consisting of organophosphorus compounds, carboxylic acids, and mixtures thereof The chelating agent is preferably a salt of EDTA (or mixture of EDTA salts) such as EDTA tetrasodium salt (sold under the tradename VERSENE 100), trisodium EDTA, or the edetates. The chelating agent should be present in: the composition at a level of from about 10–70% by weight, and preferably from about 30–50% by weight, based upon the total weight of the composition taken as 100% by weight.

Suitable carbonates for use in the instant invention include all alkali metal carbonates and bicarbonates, with sodium bicarbonate being particularly-preferred. Preferably, the carbonate is present in the composition at a level of from about 0.1–10% by weight, and more preferably from about 2–6% by weight, based upon the total weight of the composition taken as 100% by weight While most bases are suitable for use with the dissolver compositions, it is preferred that the base comprise an OH group. Preferred bases include ammonium hydroxide (preferably at a solution concentration of from about 28–30%) and pure $NH_3$ gas. The base should be present in the composition at a level of from about 0.1–10% by weight, and more preferably from about 2–6% by weight, based upon the total weight of the composition taken as 100% by weight.

When the scale to be dissolved comprises barium sulfate, it is preferred that an organophosphorus compound, such as an organophosphonic acid, be utilized in the dissolver compositions of the invention. A particularly preferred organophosphonic acid is aminotrismethylidine diphosphonic acid sold under the tradenames PHOS-2, DEQUEST 2000, and UNIHIB 305. The organophosphorus compound is preferably present in the composition at a level of from about 0.1–10% by weight, and more preferably from about 2–6% by weight, based upon the total weight of the composition taken as 100% by weight.

When the scale to be dissolved comprises calcium sulfate, it ispreferred that a carboxylic acid (preferably one having from 2–6 carbon atoms) be included in the dissolver composition. A particularly preferred carboxylic acid for use in the instant invention is hydroxyacetic acid. The carboxylic acid should be present in the composition at a level of from about 0.1–10% by weight, and more preferably from about 2–6% by weight, based upon the total weight of the composition taken as 100% by weight.

The compositions of the invention are formed by preparing a mixture comprising the chelating agent salt, the carbonate, and the component selected from the group consisting of organophosphorus compounds, carboxylic acids, and mixtures thereof. The desired base is then added to this mixture approximately 10–15 minutes after the mixture is formed. It is important to wait this amount of time in order to prevent the carbonate from falling out of solution. The final mixture should have a pH of from about 7–8.5, preferably from about 7.2–8.0, and more preferably about 7.5. If necessary, the pH should be adjusted to this range by utilizing small quantities of the base, the carbonate, and/or organophosphorus compound as necessary to reach the desired pH.

In use, the dissolver compositions are simply contacted with the scale to be dissolved or removed. The quantity of dissolver composition required is generally from about 0.5–5 gallons of composition, and preferably from about 1–3 gallons of compositon, per 2.65 lbs of scale. It is preferred, that the composition be heated to a temperature of from about 100–170° F., and more preferably from about 120–150° F., prior to the contacting step in order to more efficiently remove/dissolve the scale. Advantageously, after about 0.5–3 hours at least about 75% of the scale, and preferably at least about 100% of the scale, is dissolved or removed from the contaminated surface.

Those skilled in the art will appreciate that the instant compositions are particularly useful for removing downhole scale in oil and gas wells thus providing an effective alternative to the prior art methods. When treating oil and gas wells or pipelines with the dissolver compositions, the composition is simply injected into the well or pipeline so that it contacts the target scale as described above. Again, it is preferred that the composition first be heated to the above-described temperatures prior to injection. After injection, hot oil or hot wateris preferably flushed into the well or through the pipeline.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

Compositions for Dissolving Barium Sulfate

The following formulation was used to form a barium sulfate-dissolving composition:

TABLE 1

| Compound | Quantity | % By Weight[a] |
|---|---|---|
| Dequest 2000 (aminotrismethylidine diphosphonic acid) | 3.5 ml | 3% |
| Versene 100 (ethylenediaminetetraacetic acid tetrasodium salt) | 50 ml | 42.3% |
| Sodium bicarbonate | 5 g | 3.35% |
| Ammonium hydroxide | 5 ml | 2.9% |
| Distilled water | 70 ml | 45.6% |

[a]Based upon total weight of all components taken as 100% by weight.

The Dequest 2000 and Versene 100 were mixed together with sodium bicarbonate being added to the resulting mixture. The sodium bicarbonate was allowed to react with the Dequest 2000/Versene 100 mixture for several minutes to form a solution. Ammonium hydroxide (28%) was added to the solution followed by the distilled water. The pH of the final solution was then adjusted with Dequest 2000 until it was in the range of 7–8.5. Approximately 25 ml of the solution was placed in a beaker and heated to about 160° F. in a hot water bath. A piece of barium sulfate was added to the heated solution. The barium sulfate was completely dissolved within 15 minutes.

The above procedure was repeated five times with a different compound used in place of the Dequest 2000 each time and with the remaining compounds being as described above. The following compounds were used in place of Dequest 2000 during the five repetitions: HEDP; Unihib 106; Unihib 905; Phosphorous acid; and Briquest ADPA-60AW. In each of the runs, approximately the same size piece of barium sulfate was use. Table 2 sets forth the results for each of the five repetitions. Based upon these results, the solution which included Dequest 2000 was the most effective, with the respective solutions containing HEDP or Briquest ADPA-60AW being the next most effective. The solutions which included Unihib 905 or phosphorous acid were the least effective.

TABLE 2

| Compound in Solution | Observations |
|---|---|
| HEDP | Solution dissolved the BaSO$_4$ slowly. After 30 minutes about half of the BaSO$_4$ remained. After one hour the majority of the BaSO$_4$ had been dissolved. |
| Unihib 106 (1-hydroxyethylene-1,1-diphosphonic acid) | BaSO$_4$ dissolution was initially rapid but faded quickly. After 15 minutes, a detectable amount of the BaSO$_4$ had been dissolved, but after 30 minutes there was almost no change in the amount of BaSO$_4$ remaining. After 1 hour, the BaSO$_4$ had broken apart and only very small particles remained. |
| Unihib 905 (diethylenetriaminepenta(methyl-enephosphonic acid) | After 30 minutes and after 60 minutes, only a small amount of BaSO$_4$ had dissolved. After 1½ hours, the BaSO$_4$ pieces had broken apart but a significant amount of BaSO$_4$ remained. After 2 hours, BaSO$_4$ pieces still remained. |
| Phosphorous acid | Sample exhibited bubbling action but BaSO$_4$ did not significantly dissolve in 30 minutes. After 1 hour the BaSO$_4$ pieces were slightly smaller and bubbling less. After 2 hours, no bubbling action remained. The beaker was shaken and some of the remaining BaSO$_4$ broke apart. |

TABLE 2-continued

| Compound in Solution | Observations |
|---|---|
| Briquest ADPA 60-AW (1-hydroxyethylidene)bis-phosphonic acid | A small amount of the BaSO$_4$ was gone after 15 minutes. An further small amount was dissolved after 30 minutes. After 50 minutes the BaSO$_4$ broke apart, and after 1 hour there were only very small pieces remaining. |
| Dequest 2000 | Solution dissolved the BaSO$_4$ fairly quickly. After 15 minutes the sample was dissolved. |

Example 2

Compositions for Dissolving Calcium Sulfate

The following formulation was used to form a calcium sulfate-dissolving composition:

TABLE 2

| Compound | Quantity | % By Weight[a] |
|---|---|---|
| Hydroxyacetic acid | 3.5 ml | 2.9% |
| Versene 100 (ethylenediaminetetraacetic acid tetrasodium salt) | 50 ml | 42.3% |
| Sodium bicarbonate | 5 g | 3.35% |
| Ammonium hydroxide | 5 ml | 2.9% |
| Distilled water | 70 ml | 45.6% |

[a]Based upon total weight of all components taken as 100% by weight.

Hydroxyacetic acid and Versene 100 were mixed together with sodium bicarbonate being added to the resulting mixture. The sodium bicarbonate was allowed to react with the hydroxyacetic acid/Versene 100 mixture for several minutes to form a solution. Ammonium hydroxide (28%) was added to the solution followed by the distilled water. The pH of the final solution was then adjusted with hydroxyacetic acid until it was in the range of 7–8.5. Approximately 25 ml of the solution was placed in a beaker and heated to about 160° F. in a hot water bath. A piece of calcium sulfate was added to the heated solution. The calcium sulfate was completely dissolved within 15 minutes.

We claim:

1. A method of removing metal sulfates from surfaces on which they have formed comprising contacting said metal sulfates with an aqueous dispersion including:
   sodium bicarbonate;
   a base;
   a component selected from the group consisting of (1) an organophosphorus compound which is a salt of a chelating agent, (2) other organophosphorus compounds, (3) carboxylic acids, and (4) mixtures thereof; and
   a salt of a chelating agent when said component does not include (1) of said group.

2. The method of claim 1, wherein said dispersion is heated to a temperature of from about 100–170° F. prior to said contacting step.

3. The method of claim 1, wherein at least about 75% of the metal sulfate is removed from the surface after about 0.5–3 hours.

4. The method of claim 1, wherein said component is an organophosphorus compound.

5. The method of claim 4, wherein said component is aminotrismethylidine diphosphonic acid.

6. The method of claim 4, wherein the metal sulfate to be removed is barium sulfate.

7. The method of claim 4, wherein said organophosphorus compound is present in said dispersion at a level of from about 0.1–10% by weight, based upon the total weight of the dispersion taken as 100% by weight.

8. The method of claim 1, wherein said component is a carboxic acid.

9. The method of claim 8, wherein said component is hydroxyacetic acid.

10. The method of claim 8, wherein the metal sulfate to be removed is calcium sulfate.

11. The method of claim 8, wherein said carboxylic acid is present in said dispersion at a level of from about 0.1–10% by weight, based upon the total weight of the dispersion taken as 100% by weight.

12. The method of claim 1, wherein said chelating agent salt is EDTA tetrasodium salt.

13. The method of claim 1, wherein said chelating agent salt is present in said dispersion at a level of from about 10–70% by weight, based upon the total weight of the dispersion taken as 100% by weight.

14. The method of claim 1, wherein said sodium bicarbonate is present in said dispersion at a level of from about 0.1–10% by weight, based upon the total weight of the dispersion taken as 100% by weight.

15. The method of claim 1, wherein said base is ammonium hydroxide.

16. The method of claim 1, wherein said base is present in said dispersion at a level of from about 0.1–10% by weight, based upon the total weight of the dispersion taken as 100% by weight.

17. The method of claim 1, wherein the pH of said aqueous dispersion is from about 7–8.5.

* * * * *